United States Patent [19]

Pollard

[11] 4,452,655

[45] Jun. 5, 1984

[54] TIRE HOLDING DEVICE AND USE THEREOF

[75] Inventor: Reginald B. Pollard, Albany, Ga.

[73] Assignee: The Firestone Tire & Rubber Company, Akron, Ohio

[21] Appl. No.: 441,201

[22] Filed: Nov. 12, 1982

[51] Int. Cl.³ .............................................. B29H 17/02
[52] U.S. Cl. .................................. 156/126; 156/394.1; 211/23; 248/309.2; 294/93
[58] Field of Search ............. 156/110.1, 137, 123–127, 156/294, 394.1; 294/93; 211/23, 24; 414/908; 29/559; 248/309.2, 317; 269/48.1, 254 R

[56] References Cited

U.S. PATENT DOCUMENTS 3,219,510  11/1965  Frazier ........................... 156/127 X
3,759,394   9/1973  Hottle .................................. 211/23

Primary Examiner—William A. Powell
Assistant Examiner—Thomas Bokan
Attorney, Agent, or Firm—Ronald Brietkrenz

[57] ABSTRACT

A green tire carcass holding means having a plurality of lip members which are adapted to engage the bead portion of the green tire carcass in order to hold the carcass in a vertical orientation with a minimum of distortion.

8 Claims, 7 Drawing Figures

TIRE HOLDING DEVICE AND USE THEREOF

BACKGROUND OF THE INVENTION

1. Field of the Invention

This invention relates to a means for holding a tire and more particularly to a means for holding a green tire carcass by engaging a bead portion of said green tire carcass. Specifically, the instant invention relates to a flexible member having a prominent lip member which is adapted to engage the inner portion of the bead of a green tire carcass. In operation, the green tire carcass is adapted to slip over the flexible member having a prominent lip member whereby the lip member is spring biased in order to retain the green tire carcass on the flexible member by engaging the bead portion of the green tire carcass.

2. Description of the Prior Art

A green tire carcass is an intermediate form of a partially processed tire comprised of a generally cylindrical-shaped member having a tire bead embedded at the end of each portion of the cylindrically-shaped member. In modern tire construction, the green tire carcass, which has yet to have the stablizer plies and tread applied thereto, is oftentimes a highly flexible member that is subject to collapse by virtue of its own weight. Since the green tire carcass is not a fully processed tire, it is necessary in order to further process the green tire carcass to mount it upon a tire assembly machine of either the manual or automatic variety. In order to facilitate mounting the green tire carcass on this machinery, it is extremely important that the green tire carcass not be excessively deformed.

Conventionally, green tire carcasses are stored on either flat racks comprised of a plurality of flat surfaces upon which the green tire carcasses are placed on their ends, on pin racks which are comprised essentially of a rack having a plurality of horizontally disposed tube members over which the first stage green tire carcass is placed, or on beehive racks comprised of a plurality of oblong shaped rigid plastic members generally resembling a beehive and adapted to engage the bead portion of a green tire carcass.

Green tire carcasses stored on their ends such as in a flat rack have a tendency to collapse about their midsection. Similarly green tire carcasses stored on pin racks have a tendency to assume an elliptical configuration. Both types of distortion substantially increase the difficulty of mounting the green tire carcass on a tire machine for further processing. Beehive racks are in general difficult to use.

There is, therefore, a need for a means for storing the relatively flexible green tire carcasses in such a manner as to minimize the distortion of said carcasses in order to facilitate their mounting to equipment used for subsequent processing of the green tire carcasses.

The instant invention solves these problems by providing a means for storing first stage green tire carcasses with a minimum of distortion wherein the bead portion of the green tire carcass is engaged by a lip member which provides support for the green tire carcass.

SUMMARY OF THE INVENTION

The present invention relates to a means for storing green tire carcasses and more particularly to a flexible member having a prominent lip portion which is adapted to engage a bead of the green tire carcass in order to facilitate storage thereof.

DESCRIPTION OF AN EXEMPLARY EMBODIMENT

Figure 1:
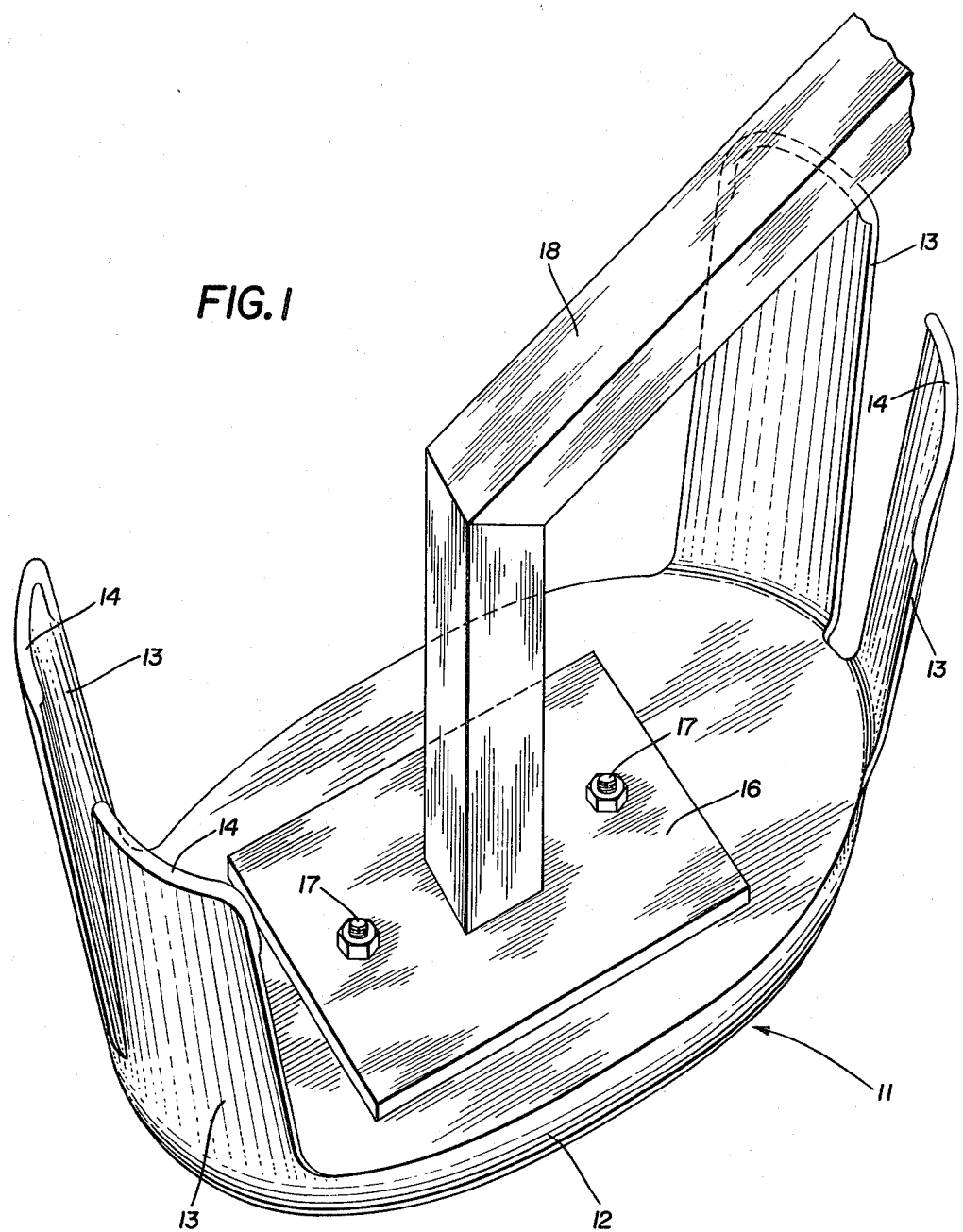
FIG. 1 is a perspective view of the instant invention.

Referring now to FIG. 1 of the drawings, there is shown a tire holding device 11. The tire holding device 11 is comprised of an elliptically-shaped, relatively-thick base member 12. Affixed to the base member 12 at opposite ends thereof are lip members 13. It should be noted that the lip members 13 each have a rounded upper edge 14 which is adapted to engage the bead portion of a green tire carcass as more fully described below.

In the exemplary embodiment, the base member 12 and lip members 13 are comprised of a single piece of injection-molded plastic preferably of high density polyethylene or nylon. It may now be appreciated that the thickness of the lip members 13 relative to their length will facilitate the deformation of the lip members 13 for reasons which will become more apparent below.

The base member 12 may be affixed to a mounting plate 16 by means of bolts 17. The mounting plate 16 is in turn affixedly attached to mounting bracket 18 which may be employed to secure the tire holding device 11 to a storage means comprised of a plurality of tire holding devices. In the exemplary embodiment, the base member 12 is approximately one inch thick and the lip members 13 protrude upward and outward at an angle of 70° to 75° from the horizontal plane. Due to the flexibility of the lip members 13, the tire holding device 11 will accept green tire carcasses having various bead diameters of 13 through 15 inches.

Figure 2:
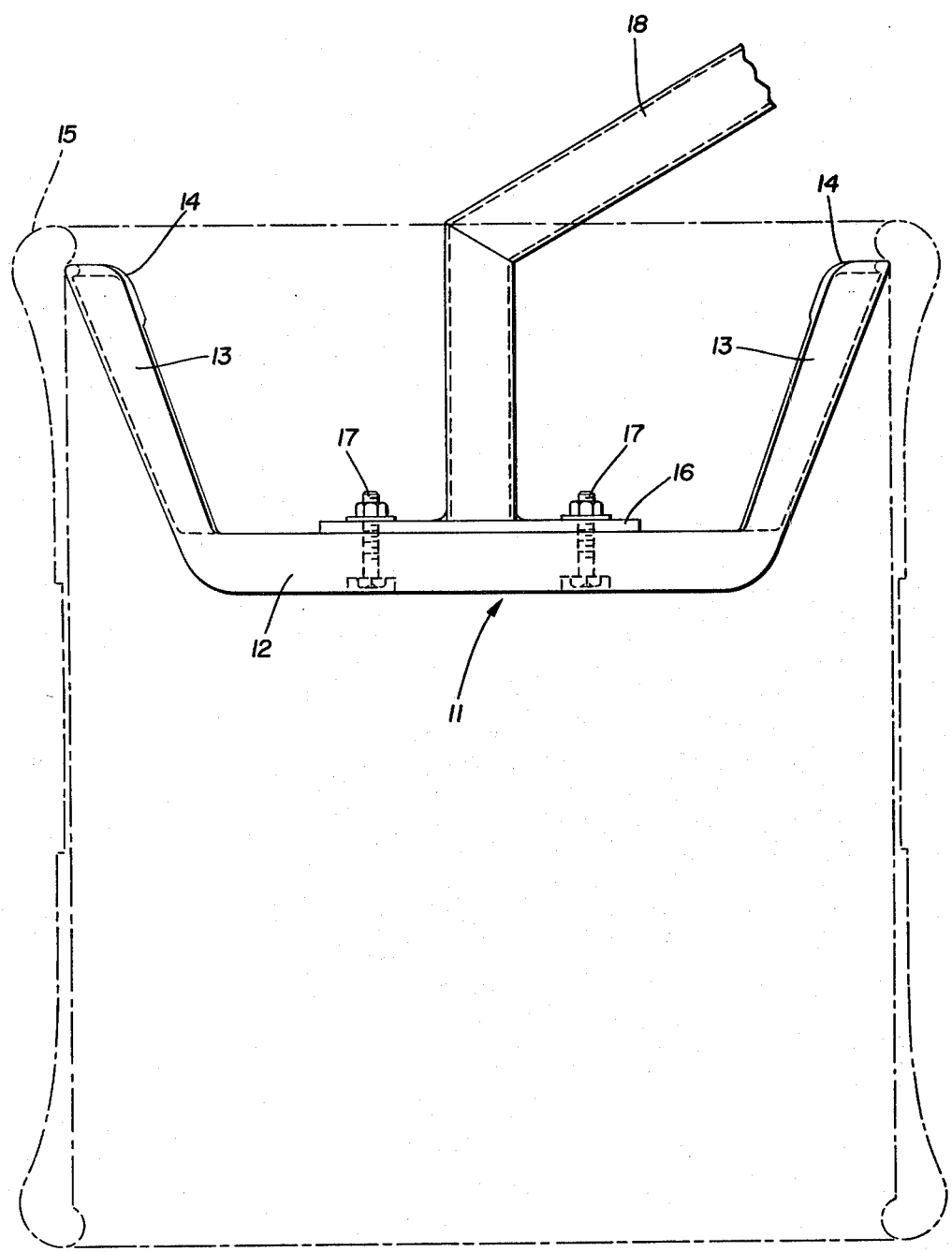
FIG. 2 is a side view of the instant invention disclosing the manner in which the instant invention grasps a green tire carcass.

FIG. 2 is a front view of the tire holding device 11 showing a green tire carcass in phantom in order to disclose the relationship of the tire holding device 11 to the green tire carcass 15. It should be noted that the round upper edges 14 of the lip members 13 are designed to engage the bead area of the green tire carcass 15 in order to vertically support the green tire carcass.

In order to remove the green tire carcass 15 from the tire holding device 11, the green tire carcass 15 is moved toward one pair of the lip members 13 thereby allowing the rounded upper edge of said lip members to disengage the bead portion of the green tire carcass thereby allowing that side of the green tire carcass to be moved downward out of engagement with the tire holding device 11. The green tire carcass 15 is then moved in the opposite direction in order to allow the rounded upper edge 14 of the opposite lip members 13 to disengage the bead portion of the green tire carcass 15 in order to fully disengage the green tire carcass 15 from the tire holding device 11.

In order to apply a green tire carcass 15 to the tire holding device 11, the green tire carcass is positioned beneath the tire holding device 11 and subsequently raised upwardly to cause a deformation of both pairs of lip members 13. After the green tire carcass 15 has been raised sufficiently to allow the bead portion thereof to pass the rounded upper edges 14 of the lip members 13, the green tire carcass 15 may be allowed to rest upon the rounded upper edges 14 of the lip members 13 thereby allowing the green tire carcass to be stored in a vertical orientation. It may be readily appreciated by one skilled in the art that it is difficult for the green tire carcass to come off of the tire holding device 11 accidentally since any downward movement of the green tire carcass 15 will simultaneously cause an outward movement of the lip members 13 into the bead portion of the green tire carcass 15 thereby insuring that the tire will not fall off of the tire holding device 11.

Figure 3:
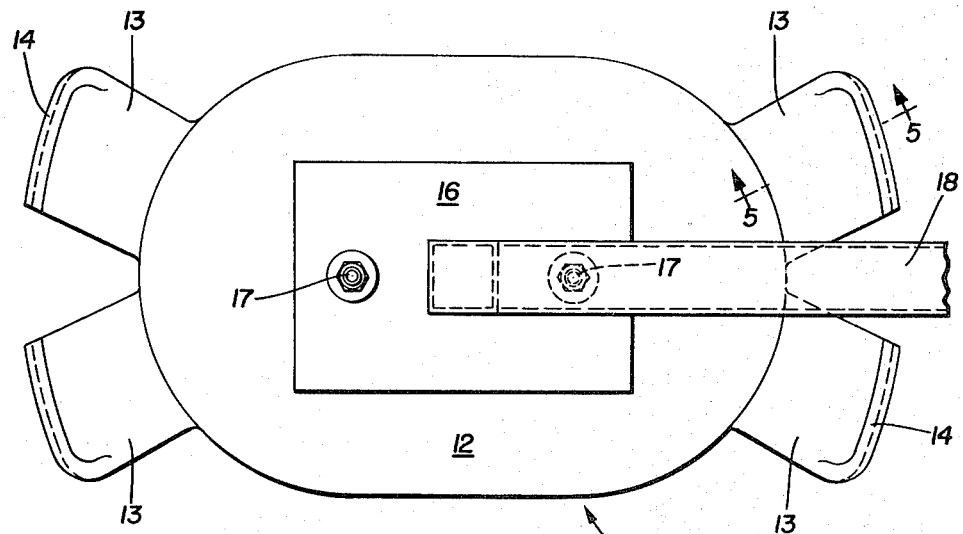
FIG. 3 is a plan view of the instant invention.
Figure 4:
FIG. 4 is a right side view of the instant invention.
Figure 5:
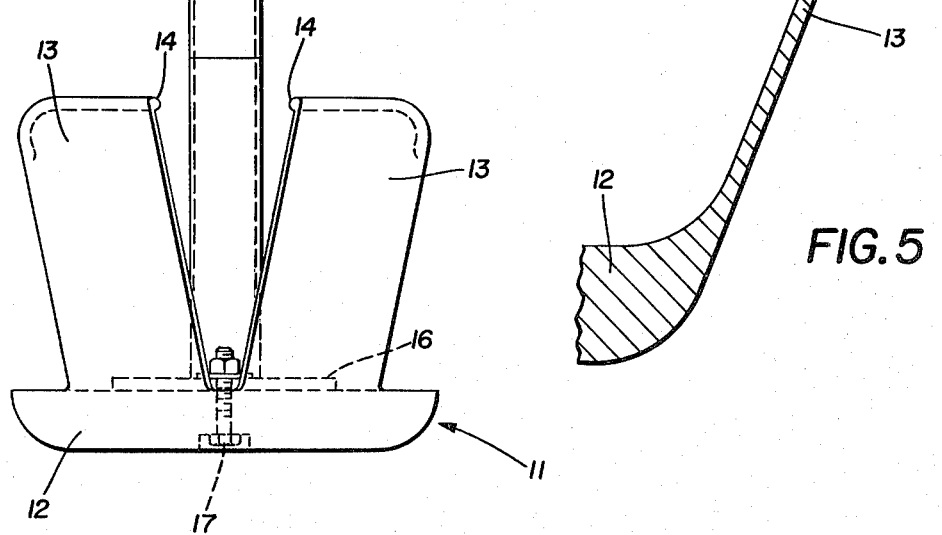
FIG. 5 is a cross section taken along the line 5—5 shown in FIG. 3 disclosing the cross section of the lip member of the instant invention.

FIGS. 3 and 4 disclose additional details of construction of the tire holding device 11. FIG. 5 is a cross sectional view taken along the line 5—5 shown in FIG. 3. FIG. 5 discloses the details of construction of the lip members 13 and the rounded upper edge 14. It should be appreciated that the dimensions of the lip member 13 are not critical but need only be thin enough in order to allow for displacement of the lip member 13 in order to facilitate mounting and demounting of a green tire carcass. The rounded upper edge 14 is provided in order that the lip member 13 does not cut into the soft rubber of the green tire carcass.

Figure 6:
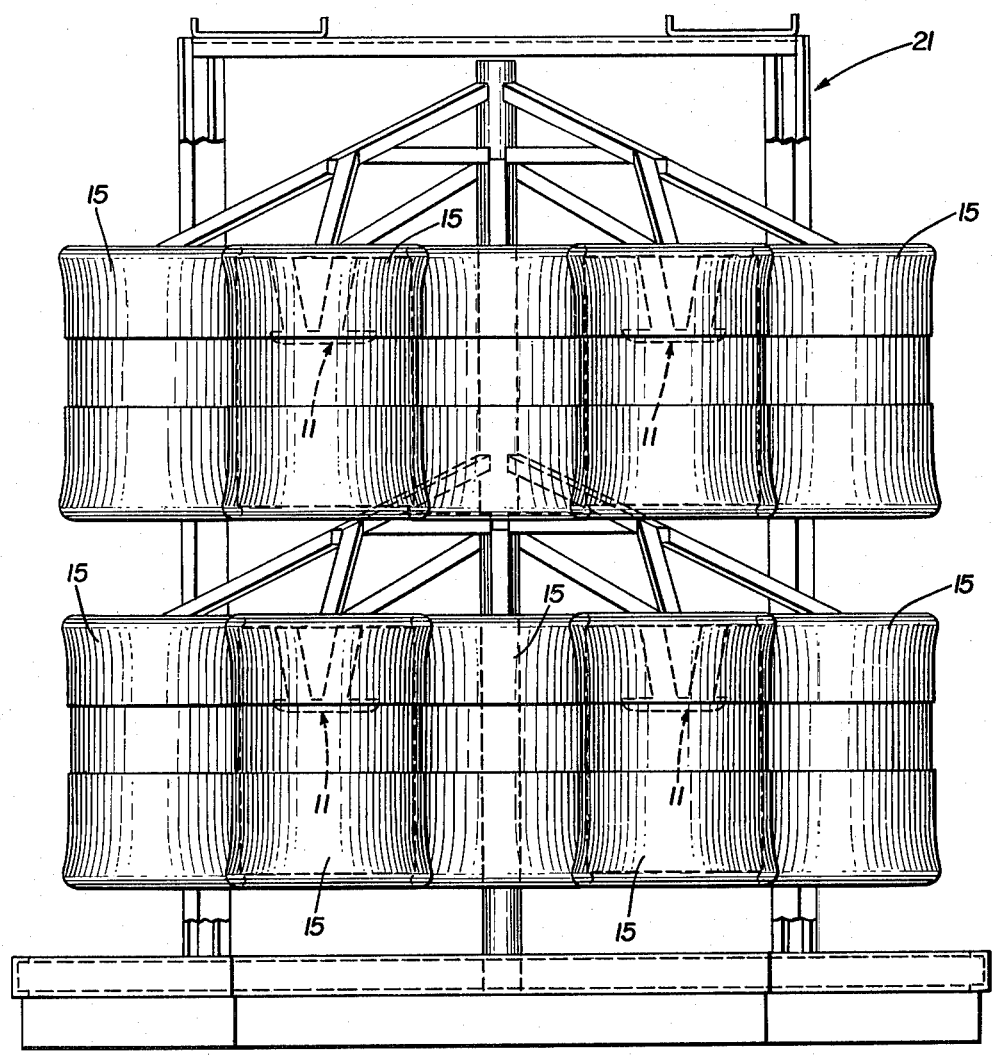
FIG. 6 is a front view of a green tire carcass storage means employing the instant invention.
Figure 7:
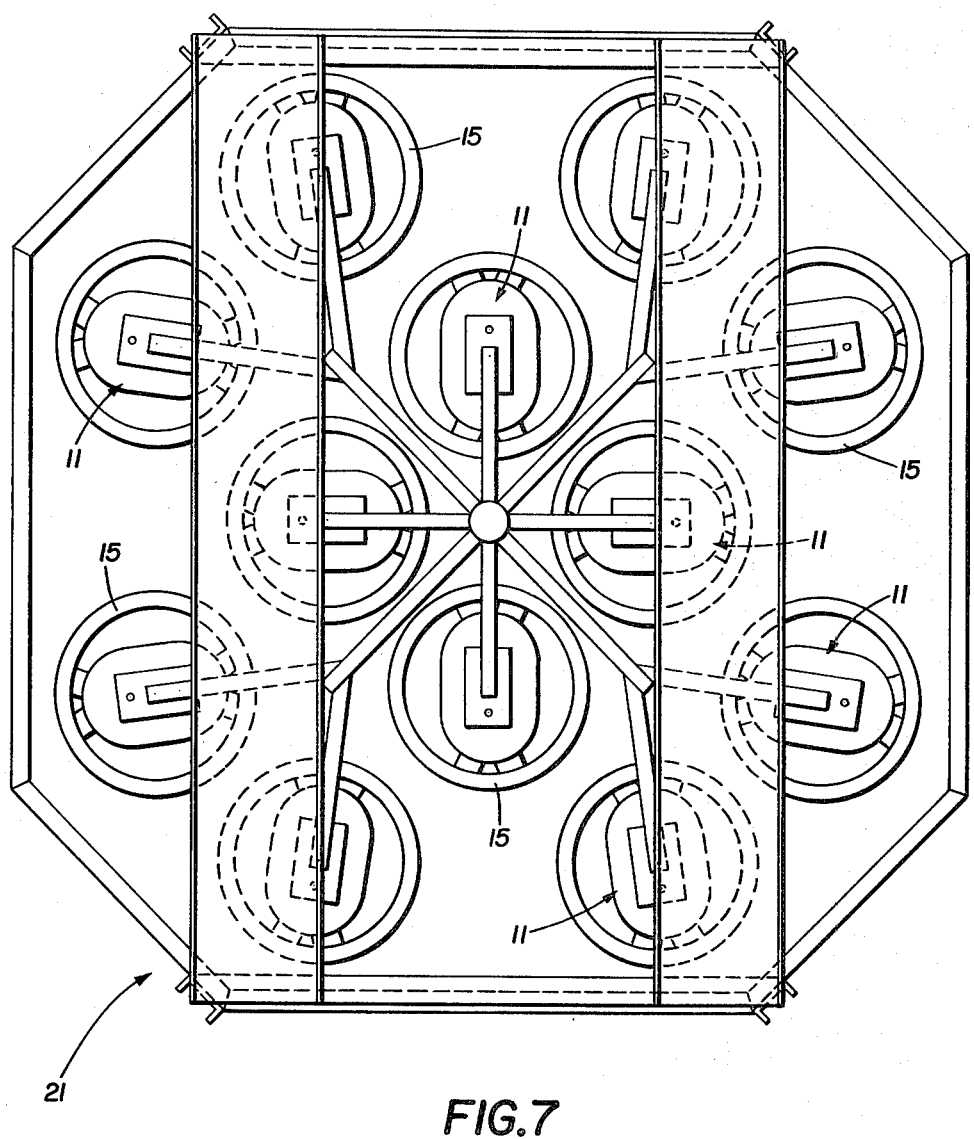
FIG. 7 is a plan view of the green tire storage means disclosed in FIG. 6.

FIG. 6 discloses rack member 21 having a plurality of tire holding devices affixed thereto in order to support a plurality of green tire carcasses 15. The rack member 21 provides for the compact storage and transportation of a plurality of green tire carcasses vertically disposed in such a manner as to eliminate distortion thereof. Due to the flexible nature of the tire holding device 11, a variety of sizes of green tire carcasses may be accommodated by the tire holding devices 11. The one piece construction of the tire holding device 11 reduces the number of components required and enhances its reliability.

It will be apparent to those skilled in the art that various modifications and additions may be made in the instant invention without departing from the essential features thereof, which are intended to be defined and secured by the appended claims.

What is claimed is:

1. An apparatus for holding a green tire carcass in a vertical orientation having at least one bead area, comprising:
    (a) base means; and
    (b) flexible protruding upward lip means affixed to said base means and adapted to engage the bead area of said green tire carcass.
2. The apparatus of claim 1 wherein said flexible lip means comprises:
    (a) at least two flexible protrusions.
3. The apparatus of claim 2 wherein said flexible protrusions are disposed at opposite sides of said base means.
4. The apparatus of claim 1 wherein said flexible lip means has at least one rounded edge.
5. The apparatus of claim 1 wherein said flexible lip means is comprised of thermoplastic material.
6. The apparatus of claim 1 wherein said flexible lip means is comprised of high density polyethylene.
7. A method for applying a green tire carcass to a holding means adapted to engage the bead area of said carcass and having at least two upward protrusions adapted for engagement of said bead area, the steps comprising:
    (a) engaging the bead area of said carcass with said protrusions;
    (b) displacing said carcass upwardly in order to place said bead area above said protrusions; and
    (c) placing said bead area on said protrusions.
8. A method for removing a green tire carcass from a holding means adapted to engage the bead area of said carcass and having at least two upward protrusions adapted for engagement of said bead area, the steps comprising:
    (a) displacing said carcass sidewardly to disengage a portion of said bead area from at least one of said protrusions:
    (b) moving said carcass downward below the engaging portion of said one protrusion;
    (c) displacing said carcass sidewardly in the opposite direction to disengage the rest of said bead area from the rest of said protrusions; and
    (d) lowering said carcass out of engagement with said holding means.

* * * * *